No. 787,776.

Patented April 18, 1905.

UNITED STATES PATENT OFFICE.

OTTO LIEBKNECHT, OF FRANKFORT-ON-THE-MAIN, GERMANY, ASSIGNOR TO ROESSLER & HASSLACHER CHEMICAL COMPANY, OF NEW YORK, N. Y.

ANTISEPTIC SOAP AND PROCESS OF MAKING SAME.

SPECIFICATION forming part of Letters Patent No. 787,776, dated April 18, 1905.

Application filed September 15, 1904. Serial No. 224,546.

*To all whom it may concern:*

Be it known that I, OTTO LIEBKNECHT, a subject of the German Emperor, and a resident of Frankfort-on-the-Main, Germany, have invented a certain new and useful Improvement in Antiseptical and Cosmetical Soap and the Process of Manufacturing the Same, of which the following is a specification.

The present invention relates to soaps for antiseptical and cosmetical purposes and to the process of manufacturing the same. Many attempts have already been made to produce such soaps; but these attempts failed because the antiseptic or cosmetic agents hitherto used in the manufacture of such soaps have had secondary noxious properties which did not render fit the soaps for human use or which destroyed them by decomposition in a very short time. So, for instance, peroxid of sodium has already been used for the said purpose; but this agent, although it acts excessively antiseptic, has the bad properties to decompose quickly within the soap, when the latter becomes useless. Besides, the said peroxid of sodium has corrosive properties which act injurious on the skin.

Now I have found that peroxid of zinc is a compound which, in combination with ordinary soap, acts effectively as an antiseptic and cosmetic, does not decompose within the soap, and has no corrosive action on the skin. This preparation has, moreover, the advantage that the presence of zinc not only favors by its antiseptic qualities the healing process, but acts directly as a curative.

I prefer to produce a soap which contains ten per cent. peroxid of zinc.

In making the same I proceed as follows: Eighty kilograms of ordinary household-soap are melted in a steam-bath, and then, while stirring violently, successively twenty kilograms of a preparation are added which is yet wet and contains about fifty per cent. of peroxid of zinc. After all twenty kilograms of the preparation have been added the mixture has assumed the consistency of a bread dough and can easily be put in pieces of convenient shape and size, which are dried afterward.

The use of this soap is the same as that of ordinary washing or toilet soap. On account of its very efficacious action it is specially fit for dermatological and chirurgical purposes.

I claim—

1. The herein-described process of manufacturing antiseptic and cosmetic soaps which consists in melting by heat ordinary household-soap and then stirring the mass while adding peroxid of zinc and finally molding the mass into pieces of proper shape and size substantially as set forth.

2. As an article of manufacture a soap made as described and containing peroxid of zinc substantially as set forth.

In testimony whereof I have signed my name to this specification in the presence of two subscribing witnesses.

OTTO LIEBKNECHT.

Witnesses:
 JEAN GRUND,
 CARL GRUND.